United States Patent [19]

Contois et al.

[11] Patent Number: 4,980,701

[45] Date of Patent: Dec. 25, 1990

[54] NON-IMPACT PRINTHEAD USING A MASK WITH A DYE SENSITIVE TO AND ADJUSTED BY LIGHT IN A FIRST SPECTRUM TO BALANCE THE TRANSMISSION OF LIGHT IN A SECOND SPECTRUM EMITTED BY AN LED ARRAY

[75] Inventors: Lawrence E. Contois, Webster; Yee S. Ng, Fairport; Eric K. Zeise, Pittsford, all of N.Y.

[73] Assignee: Eastman Kodak Company, Rochester, N.Y.

[21] Appl. No.: 375,154

[22] Filed: Jul. 3, 1989

[51] Int. Cl.⁵ .......................... G01D 15/14; B41J 2/45
[52] U.S. Cl. ............................... 346/107 R; 346/160; 346/1.1
[58] Field of Search ................ 358/300, 302, 75, 296; 346/107 R, 108, 160, 1.1; 357/30

[56] References Cited

U.S. PATENT DOCUMENTS 3,850,517  11/1974  Stephany et al. .
4,247,799   1/1981  Drexhage .
4,344,691   8/1982  Grant et al. .
4,378,567   3/1983  Mir .
4,749,120   6/1988  Hatada .
4,750,010   6/1988  Ayers et al. .
4,820,013   4/1989  Fuse ....................................... 357/30
4,827,290   5/1989  Yoritomo et al. .

FOREIGN PATENT DOCUMENTS 3421914  6/1984  Fed. Rep. of Germany .

Primary Examiner—George H. Miller, Jr.
Assistant Examiner—Scott A. Rogers
Attorney, Agent, or Firm—Norman Rushefsky

[57] ABSTRACT

An LED printhead includes an optical mask overlying the LED's to balance light outputs therefrom. The transmission density of the mask is adjusted for each LED in accordance with its respective light output to adjust same so that the light outputs from all LED's are the same. The mask comprises a UV fadeable dye whose transmission density is adjusted with a UV laser or other light source while monitoring the light output from the respective LED. The transmission density of the mask may be adjusted by a UV light source provided on the printhead during periods of nonuse of the printhead or the printhead may be removed from the recording apparatus for adjustment.

19 Claims, 2 Drawing Sheets

NON-IMPACT PRINTHEAD USING A MASK WITH A DYE SENSITIVE TO AND ADJUSTED BY LIGHT IN A FIRST SPECTRUM TO BALANCE THE TRANSMISSION OF LIGHT IN A SECOND SPECTRUM EMITTED BY AN LED ARRAY

BACKGROUND OF THE INVENTION

1. Field of the Invention

This invention relates to non-impact printers which are used for recording on photosensitive recording surfaces by electro-optical means such as light-emitting diodes and other light sources. The invention further relates to a method for making such printers to provide balanced light outputs by the recording elements.

2. Description Relative to the Prior Art

In the prior art as exemplified by DE 34 21 914 A1, an LED (light-emitting diode) printhead is disclosed wherein the problem of nonuniformity of light output from the LED's is recognized. Each printhead may include several thousand LED's arranged in a row. When the LED's are driven with the same levels of electrical current, some of the LED's are found to provide more light output than others, thereby providing nonuniformity between their respective exposures on the recording surface. To overcome this problem, the patent publication discloses that a photographic mask may be provided between the LED's and the recording surface. The mask comprises a photographic film that has been exposed by the LED's. The density of the portion of a mask opposite a resPective LED varies with the brightness of that LED so that correspondingly more light is absorbed in masked portions opposite brighter LED's. Thus, uniformity in light output is achieved or at least improved.

The problem with the use of photographic film in this type of apparatus is that the film is required to be separately developed and then must be accurately repositioned.

To overcome this problem, it has been suggested in U.S. Pat. No. 4,378,567 to provide recording elements coated with phtobleachable dyes. The dyes are photobeleached and fixed at density levels compensating for the nonuniformities between the recording elements. A problem with this apparatus, as applied at least to LED's, is that LED's over time will age differently and the balance in uniformity achieved initially will subsequently be lost.

It is an object, therefore, of the invention to provide for improved uniformity in LED printheads or the like without the noted disadvantages of the prior art.

SUMMARY OF THE INVENTION

In accordance with one aspect of the invention, the invention is directed to a non-impact printhead for recording, which comprises a plurality of recording elements for emitting light in a first spectrum in response to signals applied thereto for use in recording; and a coated layer over the recording elements, the coated layer incorporating a dye that is sensitive to light in a second spectrum different than said first spectrum, said dye changing its transmittance to light of the first spectrum in response to exposure to light in said second spectrum, and wherein the transmittance of the layer over such recording element is adjusted to balance the light emitted from the recording elements for recording.

In accordance with another aspect of the invention, the invention is directed to a method of providing uniformity in the light outputs in recording elements; said method comprising the steps of sensing the light output of a recording element, the light output being in a first spectrum; and in response to said sensing modifying the transmittance of a mask for said recording element by using light of a second spectrum different from said first spectrum.

BRIEF DESCRIPTION OF THE DRAWING

Description of the preferred embodiments of the invention will be made with reference to the accompanying Figures in which.

DESCRIPTION OF THE PREFERRED EMBODIMENT

Because apparatus of the type described herein are well known, the present description will be directed in particular to elements forming part of, or cooperating more directly with, the present invention.

Figure 1:
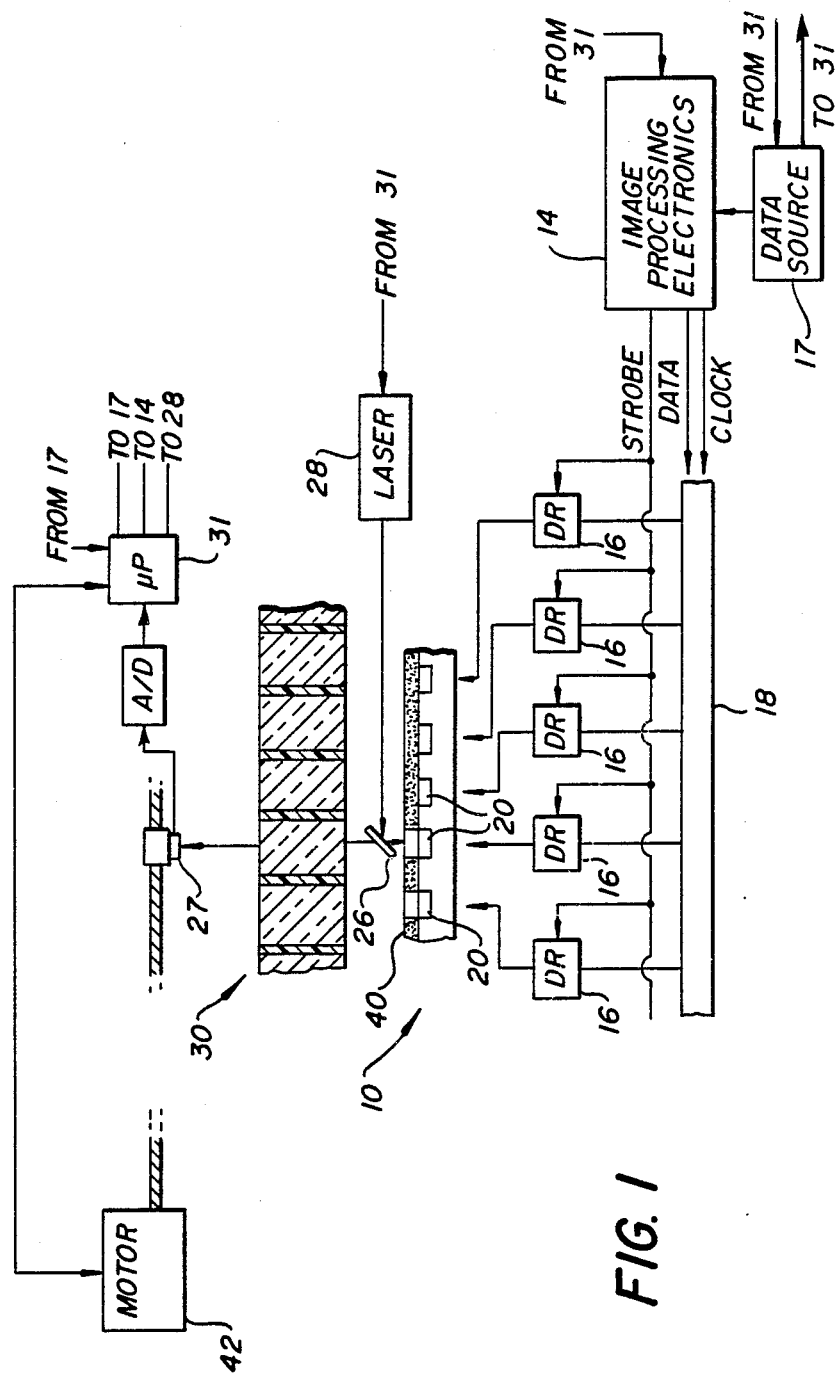
FIG. 1 is a schematic of one embodiment of an LED printhead made in accordance with the invention and illustrates a cross-section thereof of the portions dealing directly with the invention.

The apparatus for the herein disclosed invention is typified by the diagram of FIG. 1: a linear array 10 of several thousand triggerable radiation sources 20; e.g. LED's, is illustrated. The LED's are formed on chip arrays 50 which are in turn mounted with electronic driver chips on an appropriate support as is well known The LED chip arrays are positioned end to end so that a continuous row of LED's is formed. Optical means 30 for focusing the LED's for exposure onto a recording medium is also provided. In this regard, gradient index optical fiber devices such as Selfoc (trademark of Nippon Sheet Glass Co., Ltd.) arrays are highly suited. The LED's of the array 10 are triggered into operation by means of image processing electronics 14 that are responsive to image signal information from a data source 17 such as a computer of scanner 17. The image processing electronics, via a strobe signal, activates respective drivers 16 and the drivers provide current to the LED's when an image dot or pixel is to be recorded. Depending on the duration for which any given LED is turned on, the exposure effected by such LED is more or less made. Data for selecting the particular LED's to be turned on for a particular recording line of pixels is provided in digital form, i.e., digital bits of 1's and 0's that are stored for each line in registers 18 which incorporate serial-in parallel-out shift registers and latch registers for storing the data bits to allow the next line of data to be fed to the shift registers as the present line of data is being printed, see for example, U.S. Pat. No. 4,750,010. Where the recording medium is, say, photographic film the latent image formed line by line by selective exposure of said LED's may be subsequently developed by conventional means to form a visible image. Where the medium is an electrophotographic receptor, the LED's may be used to form an electrostatic image on a uniformly electrostatically charged photoconductor and this image developed using opaque toner particles and perhaps transferred to a copy sheet, see U.S. Pat. No. 3,850,517, the contents of which are incorporated herein by this reference.

As may be noted in FIG. 1, a photosensitive device such as a charge-coupled device (CCD) 27 or photodiode, is positioned at the image focal plane of the gradient index lens to sense the light output from a single LED 20. This LED is enabled by a suitable signal from a microprocessor 31 to the image processing electronics 14. The signal may be in the form of data which selects only one LED to be on and all the others to be off. A partial mirror 26 is provided in the light path between LED 20 and CCD 27. A beam of light from a laser device 28 is simultaneously activated with the turning on of the LED. The light from the laser is in this preferred embodiment in the ultraviolet spectrum ($\leq 400$ $\mu$m). Light from the LED's may be in the red or infrared spectrum, say 650–720 $\mu$m. A mask layer 40 is silk screened, spin coated or otherwise formed upon the LED's, preferably while the LED's are manufactured upon a wafer. The mask layer comprises a dielectric binder which incorporates a dye. One dye that has been found to be useful is fluorene (1,3-diphenyl-4-oxa-9-(2,4,6-trinitrophenyl)):

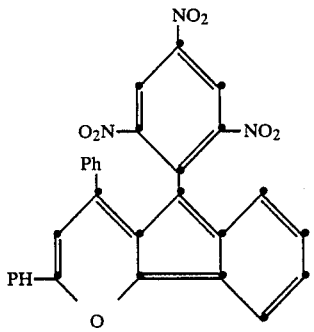

in a polyester binder such as, for example, poly(isopropylidene bisphenoxyethyl-co-ethylene terephthalate [50/50 ratio of the glycols]. However, other UV dies and binders will also be useful. Where the binder used is a dielectric, suitable openings are provided to allow wire bonds to be made to the contact pads of the LED's. These pads form a terminus for the electrical leads that are connected to each LED. Current from the drivers 16 can then be fed to these pads via the wire bonds.

In operation, light from the LED is sensed by the photosensor 27 and converted into a digital signal by A/D converter 29. The digital representation of this signal is then fed to the microprocessor 31. The microprocessor controls the laser 28 turning same on until light from the laser and reflected from mirror 26 bleaches or fades the dye such that the light level from the LED is at the appropriate level. A UV filter may be placed over the sensor 27 to block light from the laser from reaching this sensor. At this point the LED and the laser are turned off and the assembly incremented to be in position to operate upon the next LED. The assembly may be movable so as to position itself automatically at the correct position or a microscope may be provided to allow an operator to adjust the assembly manually. Automatic positioning may be accomplished by moving the assembly to the next LED and positioning same at the position where maximum intensity was noted In lieu of mirror 26 the laser beam may be aimed directly at the LED and pass through a window in the printhead cover that is UV transparent or is openable such as by a slide device.

Description will now be provided with regard to apparatus for automatic adjustment of position of the assembly, i.e., the photosensor 27 and mirror 26. As the assembly is incremented over to the next LED, this next LED is turned on and samples of light output are measured by photosensor 27 while the photosensor is stepped in increments toward its new position. These samples are stored by the microprocessor and a point of maximum intensity determined relative to a position at which such maximum was recorded. The assembly is then incremented back to that position by operation of a signal to drive motor 42 which drives the assembly with a rod 33 having screw threads. The assembly is the driven back to that position. The advantage of automatic adjustment of position is that such an assembly and driver mechanism may be incorporated permanently on the printhead so that when assembled in a recording apparatus opposite a recording element, adjustments such as described herein may be made from time to time to control uniformity. A glass plate may be placed over the printhead to block undesired UV light produced by corona chargers when in an electrophotographic recorder, or from room light. The Selfoc lens and lens holder may perform this function, too. In lieu of adjustments on the recording apparatus itself, the printhead may be removed from the recording apparatus, returned to the factory from which it was originally adjusted for adjustment in accordance with the techniques described herein and returned back to the same or some other recording apparatus.

Figure 2:
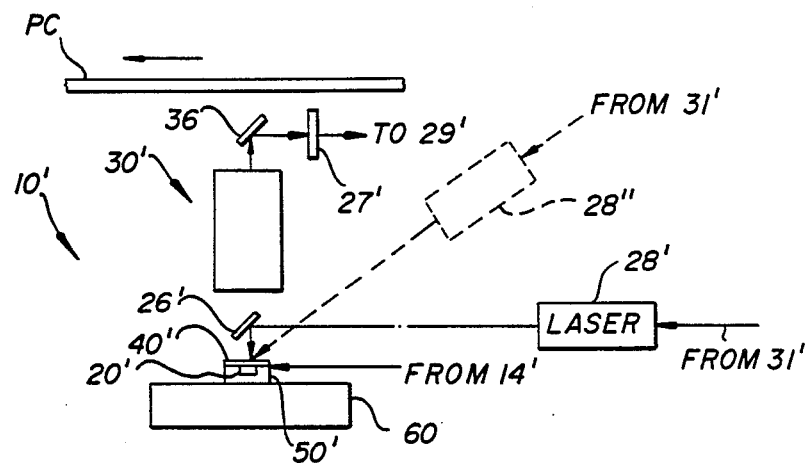
FIG. 2 is a schematic of a second embodiment of the invention showing an LED printhead in an elevational view as viewed from one end of the printhead.

With reference now to the embodiment of FIG. 2, similar elements to that shown and described with regard to FIG. 1 are noted with a prime ('). In this embodiment, the LED printhead is shown in a view from one end of the printhead In this view, the LED's 20' are arranged in a single row that would be perpendicular to the plane of the figure. The LED's are formed in chip arrays 50 that are arranged end to end as is well known and supported on a suitable support 60. The UV fadeable mask layer 40' is coated over the LED's 20'. A UV source such as a laser 28' impinges light by reflection from mirror 26' or directly without a mirror as noted in phamtom by laser 28". Where the adjustments are to be made without removal from the recording apparatus, a second mirror 36 can be provided to reflect light from the LED to the CCD 27'. The CCD 27', mirrors 36 and 26' are coupled together and are indexable along the length of the printhead by suitable means similar to that shown and described for the embodiment of FIG. 1. Where the printhead includes the capability of adjustment without removal from the recording apparatus, the apparatus' recording surface such as photographic film or photoconductor (PC) will be located as shown. CCD 27' will be located at a position optically equivalent to the image plane which is that plane in which the surface of the photoconductor (PC) is located in an electrophotographic recording apparatus.

Figure 3:
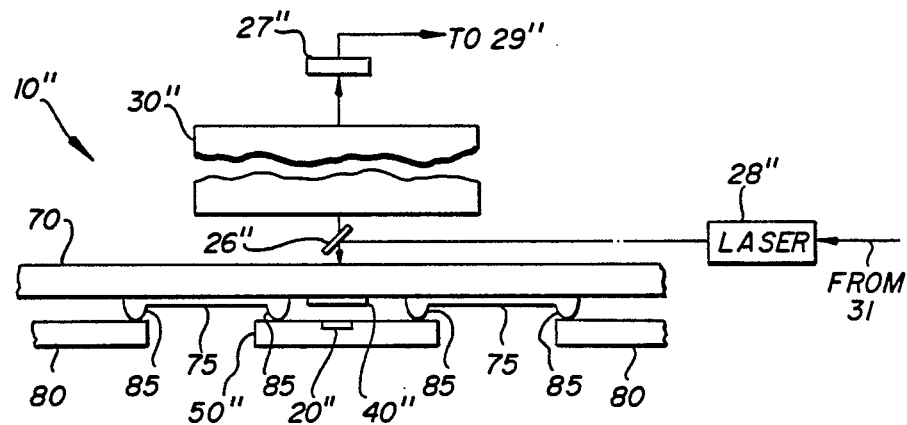
FIG. 3 is a schematic of a third embodiment of the invention showing an LED printhead in an elevational view also as viewed from one end of the printhead.

With reference now to the embodiment of FIG. 3, similar structures to that shown in FIG. 1 are indicated with a double prime ("). In addition, electrical apparatus illustrated and described with regard to FIG. 1 will also be present in the embodiments of FIGS. 2 and 3. In this embodiment, the LED array chips 50" are mounted upon a glass support 70 in a "flip-chip" manner. The glass support 70 has coated on its undersurface the metal traces or leads 75 suited for interconnecting the electronic driver chips 80 which incorporate the registers 18 and driver circuitry for driving the LED's. The driver chips 80 and LED array chips are mounted to the glass support via microbumps 85 of metal which are fabricated upon the traces or the chips. More details regarding such a structure may be noted in U.S. Pat. No. 4,749,120, the contents of which are incorporated by this reference. Also fabricated on the glass support is a strip 40″ of the UV fadeable dye. The dye is above the LED's and is selectively faded in accordance with light from UV laser 28″ provided in response to measurement of light from CCD sensor 27″. In the embodiment just described, separation of the LED's from the mask layer reduces the thermal effect that head from the LED's may produce upon the dye. Other ways to reduce thermal effects may be to provide air cooling of the printhead or reduce LED brightness by using more sensitive recording elements. Where a hardenable resin is used to bond the LED array chip to the glass, the resin may be prevented from overlaying the LED portion of the chip or the bonding resin may incorporate the UV fadeable dye and serve the function of bonding as well as being usable for control of uniformity of light output from the LED's.

While the invention has been described with reference to LED's, other recording elements contemplated include liquid crystal devices, PLZT light valves, etc.

It is also possible that the overcoating for the LED array could comprise a photochromic material which would change color from one that exhibited a strong absorption in the LED emission wavelength to one which exhibited minimal absorption in that wavelength during a uniformity exposure with a different light source at a different wavelength. Thus, after activation of the LED and read-out of its individual pixel emissivity, laser exposure with, say, UV emission may be used to modify the photochromic coating on top of the LED array for emissivity correction After the correction, every pixel of the array would exhibit similar radiant exitance.

While the invention has been described with particular reference to preferred embodiments thereof, it will be understood that variations and modifications can be effected within the spirit and scope of the invention.

We claim:

1. A non-impact printhead for recording, which comprises:
    a plurality of recording elements for emitting light in a first spectrum in response to signals applied thereto for use in recording; and
    a mask over the recording elements, the mask incorporating a dye that is sensitive to light in a second spectrum different than said first spectrum, said dye changing its transmittance to light of the first spectrum in response to exposure to light in said second spectrum, wherein the transmittance of the mask over such recording element is adjusted to balance the light emitted from the recording elements for recording;
    means for sensing light emitted from a recording element; and
    means for adjusting the transmittance of the mask over the recording elements.

2. The printhead of claim 1 and wherein the recording elements are light-emitting diodes.

3. A method of providing uniformity in the light outputs in recording elements; said method comprising the steps of:
    sensing the light output of a recording element, the light output being in a first spectrum; and in response to said sensing modifying the transmittance of a mask for said recording element by using light of a second spectrum different from said first spectrum.

4. The method of claim 3 and wherein electrical signals are generated in response to the sensing of the light output from the recording element and the transmittance is adjusted by exposure of a dye within the mask by light from another source.

5. The method of claim 4 and wherein the recording elements are light-emitting diodes.

6. The method of claim 5 and wherein the transmittance of mask portions corresponding to respective light-emitting diodes are adjusted to balance the light outputs from the combination of the light-emitting diodes and their respective mask portions.

7. The method of claim 4 and wherein the transmittance of mask portions corresponding to respective recording elements are adjusted to balance the light outputs from the combination of the recording elements and their respective mask portions.

8. The method of claim 3 and wherein the transmittance of mask portions corresponding to respective recording elements are adjusted to balance the light outputs from the combination of the recording elements and their respective mask portions.

9. The method of claim 8 and including the steps of forming the mask as a layer over the recording elements, the layer including a dye that changes its transmittance in response to light of said second spectrum.

10. The method of claim 9 and wherein the recording elements are bonded to a transparent substrate by a bonding resin and the bonding resin also comprises the mask.

11. The method of claim 3 and wherein the light is sensed after passing through a lens that is used in printing by recording exposures of said recording elements upon a photosensitive material.

12. The method of claim 9 and wherein the second spectrum is ultraviolet.

13. A non-impact printhead for recording, which comprises:
    a plurality of light-emitting recording elements formed upon a chip array;
    a transparent support having a surface upon which the chip array is supported with the recording elements facing said surface so that light from the elements impinge upon said surface;
    mask means between said recording elements and said surface, said mask means providing selective transmittance from said recording elements so as to balance relative to each other the light outputs of the recording elements that will impinge upon a recording medium;
    means for sensing light emitted from a recording element; and
    means for adjusting the transmittance of the mask over the recording elements.

14. The printhead of claim 13 and wherein the mask is mounted upon said surface of the support and is spaced from the recording elements.

15. The printhead of claim 13 and wherein the mask is mounted upon said surface, said recording elements emitting light in a first spectrum in response to signals applied thereto for use in recording;

the mask incorporating a dye that is sensitive to light in a second spectrum different than said first spectrum, said dye changing its transmittance to light of the first spectrum in response to exposure to light in said second spectrum, and wherein the transmittances of the mask means over such recording elements are adjusted to balance the light emitted from the recording elements for recording.

16. The printhead of claim 13 and wherein the recording elements are light-emitting diodes.

17. The printhead of claim 15 and wherein the recording elements are light-emitting diodes.

18. The printhead of claim 13 and wherein a bonding resin bonds said chip array to said transparent support and wherein the bond resin comprises the mask means.

19. The printhead of claim 18 and wherein the bonding resin incorporates a dye that is sensitive to light in a second spectrum that is of a different spectrum from light emitted by said recording elements, said dye changing its transmittance to light of first spectrum in response to exposure to light in said second spectrum, and wherein the transmittances of the mask means over such recording elements are adjusted to balance the light emitted from the recording elements for recording.

* * * * *